United States Patent
Oyama et al.

(10) Patent No.: US 7,511,977 B2
(45) Date of Patent: Mar. 31, 2009

(54) CHARGE-PUMP TYPE SWITCHING POWER SUPPLY APPARATUS

(75) Inventors: Manabu Oyama, Kyoto (JP); Daisuke Uchimoto, Kyoto (JP)

(73) Assignee: Rohm Co., Ltd. (JP)

( * ) Notice: Subject to any disclaimer, the term of this patent is extended or adjusted under 35 U.S.C. 154(b) by 197 days.

(21) Appl. No.: 11/714,462

(22) Filed: Mar. 6, 2007

(65) Prior Publication Data
US 2007/0211503 A1 Sep. 13, 2007

(30) Foreign Application Priority Data
Mar. 7, 2006 (JP) ............................... 2006-061694

(51) Int. Cl.
*H02M 3/18* (2006.01)
(52) U.S. Cl. ........................... 363/62; 363/61; 307/109; 307/110
(58) Field of Classification Search ................... 363/59, 363/60, 61, 62; 327/536; 307/109, 110
See application file for complete search history.

(56) References Cited

U.S. PATENT DOCUMENTS

| | | | | |
|---|---|---|---|---|
| 5,726,870 A | * | 3/1998 | Lavieville et al. | 363/62 |
| 6,021,056 A | * | 2/2000 | Forbes et al. | 363/60 |
| 6,064,583 A | * | 5/2000 | Lochner et al. | 363/62 |
| 6,198,645 B1 | * | 3/2001 | Kotowski et al. | 363/59 |
| 6,693,808 B2 | * | 2/2004 | Myono | 363/62 |

FOREIGN PATENT DOCUMENTS

| | | |
|---|---|---|
| JP | 2001-258241 | 9/2001 |
| JP | 2005-224059 | 8/2005 |
| JP | 2005-224060 | 8/2005 |

* cited by examiner

*Primary Examiner*—Bao Q Vu
(74) *Attorney, Agent, or Firm*—Cantor Colburn LLP (57) ABSTRACT

A switching power supply apparatus generates a first output voltage with a reversed polarity of an input voltage and a second input voltage of double the input voltage with the reversed polarity, and then outputs them from the first output terminal and the second output terminal. A driver circuit includes a control unit and a first switch to a sixth switch. The driver circuit repeats three charging periods in a time-division manner. The three charging periods are a first charging period during which a flying capacitor is charged with the input voltage, a second charging period in which a low-potential-side terminal of the flying capacitor is connected to a ground terminal and a first output capacitor is charged with a voltage appearing at the other end of the flying capacitor, and a third charging period in which a high-potential-side of the flying capacitor is connected with the first output terminal and a second output capacitor is charged with a voltage appearing at the other end of the flying capacitor.

16 Claims, 7 Drawing Sheets

CHARGE-PUMP TYPE SWITCHING POWER SUPPLY APPARATUS

BACKGROUND OF THE INVENTION

1. Field of the Invention

The present invention relates to a charge-pump type switching power supply apparatus.

2. Description of the Related Art

For the compact-size information terminals in recent years such as mobile phones and PDAs (Personal Digital Assistance), there are some devices such as LEDs (Light Emitting Diode) used for the backlight of a liquid display, for instance, wherein they require a voltage higher than the output voltage of a battery. For example, Li-ion batteries are often used for these small-size information terminals. The output voltage thereof is normally about 3.5 V, and when fully charged, it is about 4.2 V. However, as the LED driving voltage, the LED requires voltage higher than the battery voltage. Accordingly, when the voltage higher than the battery voltage is required, a booster circuit of a switched-capacitor or the like method is used to boost the battery voltage so as to obtain the voltage necessary for driving a load circuit such as an LED. There are cases where a negative power supply is required by such a small information terminal device. In such a case, too, a voltage inverter circuit of a charge-pump method is used to obtain a desired negative voltage (See Reference (1) in the following Related Art List, for instance).

Related Art List
(1) Japanese Patent Application Laid-Open No. 2001-258241.
(2) Japanese Patent Application Laid-Open No. 2005-224060.
(3) Japanese Patent Application Laid-Open No. 2005-224059.

Consider a case where in a small information terminal device both a load circuit requiring voltage higher than the battery voltage and a load circuit requiring negative voltage are driven simultaneously. In such a case, a method is conceivable where a booster circuit and a voltage inverter circuit for supplying voltage to the respective load circuits are mounted respectively. In this method, however, a flying capacitor must be provided each for the booster circuit and the voltage inverter circuit. The capacitance of a flying capacitor is large in general and therefore the flying capacitors are often provided as external circuit components (chip components). Thus, if this external flying capacitor is provided for each power supply apparatus, the number of circuit components will increase, which in turn obstructs a demand for reduction in size and cost of small information terminals.

SUMMARY OF THE INVENTION

The present invention has been made in view of the foregoing problems, and a general purpose thereof is to provide a switching power supply apparatus capable of outputting a plurality of levels of voltages with a simplified circuit structure.

One embodiment of the present invention relates to a switching power supply apparatus for generating a first output voltage having a reversed polarity of an input voltage and a second output voltage of double the input voltage with a reversed polarity and then outputting them from a first output terminal and a second output terminal. This switching power supply apparatus comprises: a flying capacitor; a first output capacitor connected with the first output terminal; a second output capacitor connected with the second output terminal; and a driver circuit which controls charge states of the flying capacitor, the first output capacitor and the second output capacitor. The driver circuit repeats a first charging period, a second charging period and a third charging period in a time-division manner. Here, the first charging period is a period during which the flying capacitor is charged with the input voltage; the second charging period is a period in which a high-potential-side terminal of the flying capacitor is connected with a fixed potential terminal and the first output capacitor is charged with a voltage appearing at the other end thereof; and the third charging period is a period in which a high-potential-side terminal of the flying capacitor is connected with the first output terminal and the second output capacitor is charged with a voltage appearing at the other end thereof; and the voltages appearing at the first output capacitor and the second output capacitor are outputted from the first output terminal and the second output terminal as the first output voltage and the second output voltage.

In the first charging period, the flying capacitor is charged with the input voltage Vin. In the second charging period, the first output capacitor is charged with the inverted voltage of the input voltage Vin, so that a voltage −Vin which is the input voltage with a reversed polarity thereof is generated as the first output voltage. In the third charging period, the second output capacitor is charged with a voltage which is lower than the first output voltage (−Vin) appearing at the first output capacitor by the input voltage Vin charged in the flying capacitor, so that a voltage −2×Vin of double the input voltage Vin with a reversed polarity is generated as the second output voltage. According to this embodiment, with a simplified circuit configuration where only a single flying capacitor is used, two negative output voltages (−Vin and −2Vin) can be generated from the input voltage Vin.

The driver circuit may control the charge states of the flying capacitor, the first output capacitor and the second output capacitor in a cycle of the first charging period, the second charging period and the third charging period. In a first charging period, the flying capacitor is charged up each time prior to a second charging period and a third charging period, so that a stable output voltage can be generated.

Another embodiment of the present invention relates to a switching power supply apparatus for further generating a third output voltage which is double the input voltage, in addition to the first and the second output voltage, and then outputting it from a third output terminal. This switching power supply apparatus further comprises a third output capacitor connected with the third output terminal. The driver circuit controls a charge state of the third output capacitor in addition to the first output capacitor and the second output capacitor and, in addition to the first to the third charging period, the driver circuit repeats a fourth charging period in which a low-potential-side of the flying capacitor is connected with an input terminal to which the input voltage is inputted and the third output capacitor is charged with a voltage appearing at the other end thereof; and a voltage appearing at the third output capacitor is outputted as the third output voltage from the third output terminal.

In the fourth period, the third output capacitor is charged with a voltage which is double the input voltage. According to this embodiment, three output voltages (e.g., 2×Vin, −Vin and −2Vin) can be suitably generated with a structure in which a single flying capacitor is provided.

The driver circuit may charge the flying capacitor in the first charging period before the first output capacitor, the second output capacitor and the third output capacitor are charged in the second charging period, the third charging period and the fourth charging period, respectively. In a first charging period, the flying capacitor is charged up each time prior to a second charging period, a third charging period and a fourth charging period, so that a stable output voltage can be generated.

Still another embodiment of the present invention relates also to a switching power supply apparatus for generating a first output voltage having a reversed polarity of an input voltage and a second output voltage of double the input voltage Vin with a reversed polarity and then outputting them from a first output terminal and a second output terminal. This switching power supply apparatus comprises: a flying capacitor; a first output capacitor provided between the first output terminal and a fixed potential terminal; a second output capacitor provided between the second output terminal and a fixed potential terminal; a first switch provided between one end of the flying capacitor and an input terminal; a second switch provided between the one end of the flying capacitor and a fixed voltage terminal; a third switch provided between the one end of the flying capacitor and the first output terminal; a fourth switch provided between other end of the flying capacitor and a fixed potential terminal; a fifth switch provided between the other end of the flying capacitor and the first output terminal; a sixth switch provided between the other end of the flying capacitor and the second output terminal; and a control unit which controls on-off states of the first switch to the sixth switch.

According to this embodiment, with a simplified circuit configuration where only a single flying capacitor is used, two negative output voltages (−Vin and −2Vin) can be generated from the input voltage Vin.

The control unit may repeat a first charging period, a second charging period and a third charging period in a time-division manner. Here, the first charging period is a period in which the first switch and the fourth switch are turned on and the flying capacitor is charged with the input voltage, the second charging period is a period in which the second switch and the fifth switch are turned on and the first output capacitor is charged with a voltage having the reversed polarity of the input voltage, and the third charging period is a period in which the third switch and the sixth switch are turned on and the second output capacitor is charged with a voltage of double the input voltage with the reversed polarity.

Still another embodiment of the present invention relates to a driver circuit. This driver circuit drives the above-described switching power supply apparatus, and it includes: the first switch to the sixth switch; and the control unit, wherein the driver circuit is integrated onto a single semiconductor substrate.

According to this embodiment, the flying capacitor and a plurality of output capacitors are connected with the driver circuit, so that a plurality of different output voltages can be generated with a simplified structure.

Still another embodiment of the present invention relates also to a switching power supply apparatus. This switching power supply apparatus generates a third output voltage, which is double the input voltage, in addition to the aforementioned first and second output voltages and then outputs the third output voltage from a third output terminal, and it further comprises: a third output capacitor connected with the third output terminal; a seventh switch provided between the other end of the flying capacitor and the input terminal; and an eighth switch provided between the one end of the flying capacitor and the third output terminal. The control unit further controls on-off states of the seventh switch and the eighth switch.

According to this embodiment, three output voltages (e.g., 2×Vin, −Vin and −2Vin) can be suitably generated with a structure in which a single flying capacitor is provided.

The control unit may repeat a first charging period, a second charging period, a third charging period and a fourth charging period in a time-division manner. Here, the first charging period is a period in which the first switch and the fourth switch are turned on and the flying capacitor is charged with the input voltage; the second charging period is a period in which the second switch and the fifth switch are turned on and the first output capacitor is charged with a voltage having the reversed polarity of the input voltage; the third charging period is a period in which the third switch and the sixth switch are turned on and the second output capacitor is charged with a voltage of double the input voltage with the reversed polarity; and the fourth charging period is a period in which the seventh switch and the eighth switch are turned on and the third output capacitor is charged with a voltage of double the input voltage.

Still another embodiment of the present invention relates to a driver circuit for driving the above-described switching power supply apparatus. This driver circuit includes the first switch to the eighth switch; and the control unit, wherein the driver circuit is integrated onto a single semiconductor substrate.

According to this embodiment, the flying capacitor and a plurality of output capacitors are connected with the driver circuit, so that a plurality of different levels of output voltages can be produced with a simplified structure.

Still another embodiment of the present invention relates to a switching power supply apparatus for generating a first output voltage to an nth output voltage (n being an integer greater than or equal to 2), whose voltage levels differ from one another, based on an input voltage inputted to an input terminal and then outputting them respectively from first through nth output terminals. This switching power supply apparatus comprises: a flying capacitor which is charged with the input voltage; a first output capacitor to an nth output capacitor provided for the first output terminal to the nth output terminal, respectively; a plurality of switches provided on charging paths leading to or from the flying capacitor and the first through nth output capacitors; and a control unit which controls charge states of the flying capacitor and the n output capacitors by controlling on-off states of the plurality of switches. When any one of the input voltage, ground voltage, an ith output voltage appearing at an ith output capacitor (i being an integer that satisfies $1 \leq i \leq n$) is set as a reference voltage, a jth output voltage appearing at a jth output capacitor (j being an integer that satisfies $1 \leq j \leq n$ and $i \neq j$) is a voltage obtained after the input voltage has been added to the reference voltage or after the input voltage has been subtracted from the reference voltage; when the input voltage is to be added to the reference voltage, the control unit turns on a switch provided between a high-potential-side terminal of the flying capacitor and the jth output terminal and a switch provided between a low-potential-side terminal of the flying capacitor and a terminal at which the reference voltage appears, in the charge state of the jth output capacitor; and when the input voltage is to be subtracted from the reference voltage, the control unit turns on a switch provided between a low-potential-side terminal of the flying capacitor and the jth output terminal and a switch provided between a high-potential-side terminal of the flying capacitor and a terminal at which the reference voltage appears, in the charge state of the jth output capacitor.

According to this embodiment, the input voltage, the inverted voltage of the input voltage and a voltage in combination thereof can be generated with a simplified structure comprised of a single flying capacitor and output capacitors each provided for each of output terminals.

The input terminal may include a first input terminal and a second input terminal to which a first input voltage and a second input voltage are inputted, respectively. The flying capacitor may be charged with the first input voltage; and when any one of the first input voltage, the second input voltage, ground voltage and the ith output voltage is set as the reference voltage, the jth output voltage may be a voltage obtained after the input voltage has been added to the reference voltage or after the input voltage has been subtracted from the reference voltage.

Still another embodiment of the present invention relates to a driver circuit for driving the above-described switching power supply apparatus, and it includes the plurality of switches; and the control unit which controls on-off states of said plurality of switches, wherein the driver circuit is integrated onto a single semiconductor substrate.

Still another embodiment of the present invention relates to an electronic apparatus. This electronic apparatus comprises: any of the above-described switching power supply apparatuses; and a plurality of loads driven by output voltage of the switching power supply apparatus.

According to this embodiment, the load circuits requiring a plurality of levels of drive voltages can be driven with a simplified structure, so that the reduction in the size and cost of electronic apparatus can be realized.

It is to be noted that any arbitrary combination or rearrangement of the above-described structural components and so forth is also effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

First Embodiment

Figure 1:
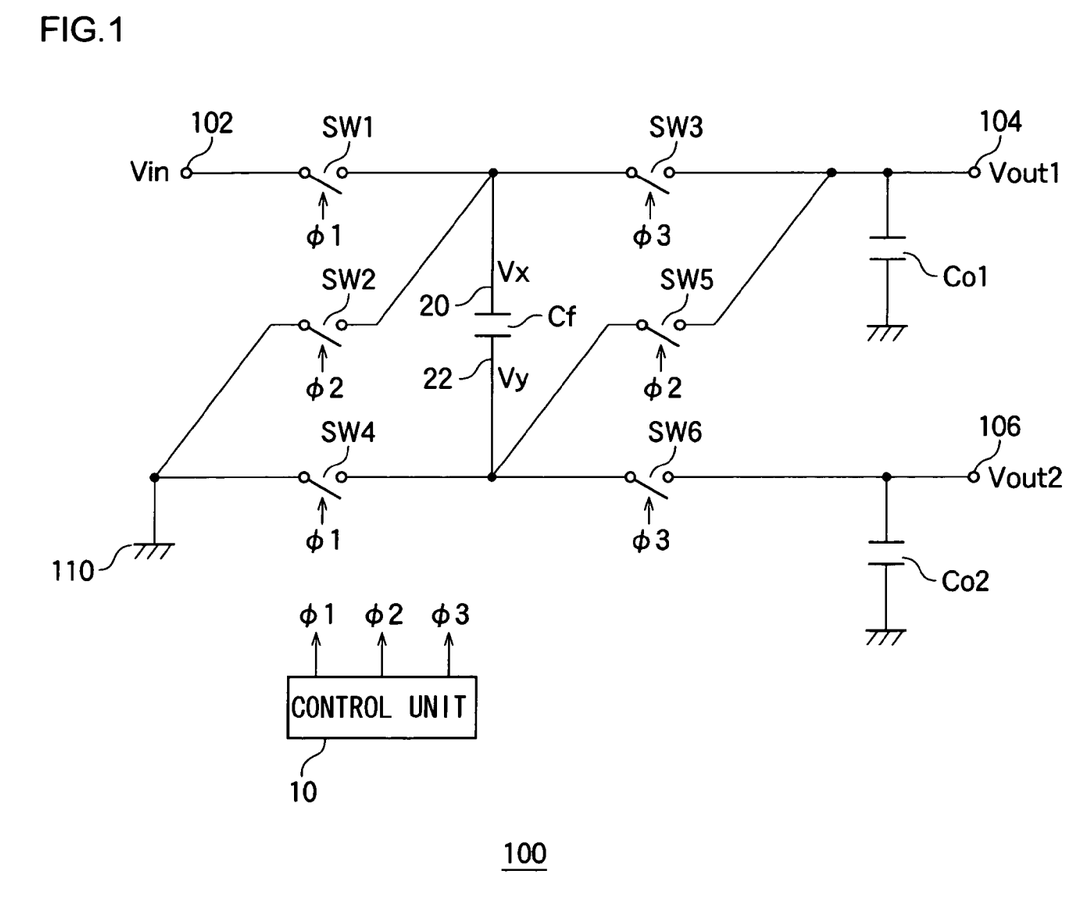
FIG. 1 is a circuit diagram showing a structure of a switching power supply apparatus according to a first embodiment of the present invention.

FIG. 1 is a circuit diagram showing a structure of a switching power supply apparatus 100 according to a first embodiment of the present invention. This switching power supply apparatus 100 includes an input terminal 102, a first output terminal 104, and a second output terminal 106. A first output voltage Vout1(=−Vin), having the reversed polarity of an input voltage Vin applied to the input terminal 102, is outputted from the first output terminal 104. A second output voltage Vout2(=−2×Vin), which is double the input voltage Vin with a reversed polarity, is outputted from the second output terminal 106.

This switching power supply apparatus 100 is comprised of a flying capacitor Cf, a first switch SW1 to a sixth switch SW6, a first output capacitor Co1, a second output capacitor Co2, and a control unit 10 which controls the ON-OFF states of the first switch SW1 to the sixth switch SW6.

The first output capacitor Co1, which is provided between the first output terminal 104 and a ground terminal 110 whose potential is fixed, supplies electric charge to a load circuit connected with the first output terminal 104. Similarly, the output capacitor Co2, which is provided between the second output terminal 106 and a ground terminal 110, supplies electric charge to a load circuit connected with the second output terminal 106.

The flying capacitor Cf is charged with the input voltage Vin connected to the input terminal 102, stores electric charge temporarily, and then transfer the electric charge to the first output capacitor Co1 or the second output capacitor Co2. In order to distinguish two electrodes of the flying capacitor Cf, one end thereof is denoted by the reference numeral 20 and the other end thereof 22. Voltage appearing at the one end 20 is denoted by Vx and voltage appearing at the other end 22 is denoted by Vy.

The first switch SW1 to the sixth switch SW6 are provided among the flying capacitor Cf, the first output capacitor Co1, the second output capacitor Co2 and the ground terminal 110, and each switch switches a state of charge/discharge of each capacitor. The first switch SW1 to the sixth switch SW6 may each be constituted by a transistor such as a MOSTFET (Metal Oxide Semiconductor Field Effect Transistor) wherein the ON-OFF state thereof can be controlled by a voltage applied to a gate terminal of the MOSFET.

The first switch SW1 is provided between one end 20 of the flying capacitor Cf and the input terminal 102 to which the input voltage Vin is applied. The second switch SW2 is provided between the one end 20 of the flying capacitor Cf and a ground terminal 110 which is a fixed voltage terminal. The third switch SW3 is provided between the one end 20 of the flying capacitor Cf and the first output terminal 104.

The fourth switch SW4 is provided between the other end 22 of the flying capacitor Cf and the ground terminal 110. The fifth switch SW5 is provided between the other end 22 of the flying capacitor Cf and the first output terminal 104. The sixth switch SW6 is provided between the other end 22 of the flying capacitor Cf and the second output terminal 106.

The control unit 10 controls the ON-OFF states of first switch SW1 to the sixth switch SW6 so that the following first charge period φ1 to third charge period φ3 are repeated.

First Charging Period φ1

As the first switch SW1 and the fourth switch SW4 turn on, the other end 22 of the flying capacitor Cf is grounded and the input voltage Vin is applied to the one end 20 thereof and therefore the flying capacitor Cf is charged with the input voltage Vin. In the state where the flying capacitor Cf is charged up, a potential difference ΔV between the one end 20 and the other end 22 is equal to the input voltage Vin, that is, Vx=Vy+ΔV=Vy+Vin holds. A period during which the flying capacitor Cf is charged with the input voltage Vin after the first switch SW1 and the fourth switch SW4 have turned on is denoted by ϕ1.

Second Charging Period ϕ2

As the second switch SW2 turns on, the one end 20 of the flying capacitor Cf is connected to the ground terminal 110 and hence the voltage Vx thereof becomes equal to the ground voltage of 0 V. As a result, the voltage at the other end 22 of the flying capacitor Cf becomes Vy=Vx−ΔV=−Vin and there appears the inverted voltage of the input voltage Vin.

At this time, if the fifth switch SW5 is simultaneously turned on, the other end 22 of the flying capacitor Cf will be connected with the first output terminal 104, and the first output capacitor Co1 connected between the first output terminal 104 and a ground terminal will be charged with the voltage Vy. As a result, a voltage which is equal to the voltage Vy at the other end 22 of the flying capacitor Cf is outputted as the first output voltage Vout1 from the first output terminal 104. That is, this voltage equal to −Vin which is the input voltage Vin with a reversed polarity thereof is outputted from the first output terminal 104.

A period during which the first output capacitor Co1 is charged with the voltage Vy after the second switch SW2 and the fifth switch SW5 have turned on is denoted by ϕ2.

Third Charging Period ϕ3

As the third switch SW3 turns on, the one end 20 of the flying capacitor Cf is connected with the first output terminal 104 and therefore the voltage Vx thereof becomes equal to the first output voltage Vout1. When the flying capacitor Cf is charged with the input voltage Vin, Vy=Vout1−Vin holds and the first output voltage Vout1 is so generated as to satisfy Vout1=−Vin. Thus the voltage at the other end 22 of the flying capacitor Cf is Vy=−Vin−Vin=−2×vin, which is double the input voltage Vin with a reversed polarity.

At this time, if the sixth switch SW6 is simultaneously turned on, the other end 22 of the flying capacitor Cf will be connected with the second output terminal 106, and the second output capacitor Co2 connected between the second output terminal 106 and a ground terminal is charged with the voltage Vy. As a result, a voltage which is double the input voltage Vin with a reversed polarity, namely −2×Vin, is outputted from the second output terminal 106.

A period during which the second output capacitor Co2 is charged with the voltage Vy after the third switch SW3 and the sixth switch SW6 have turned on is denoted by ϕ3.

Figure 2:
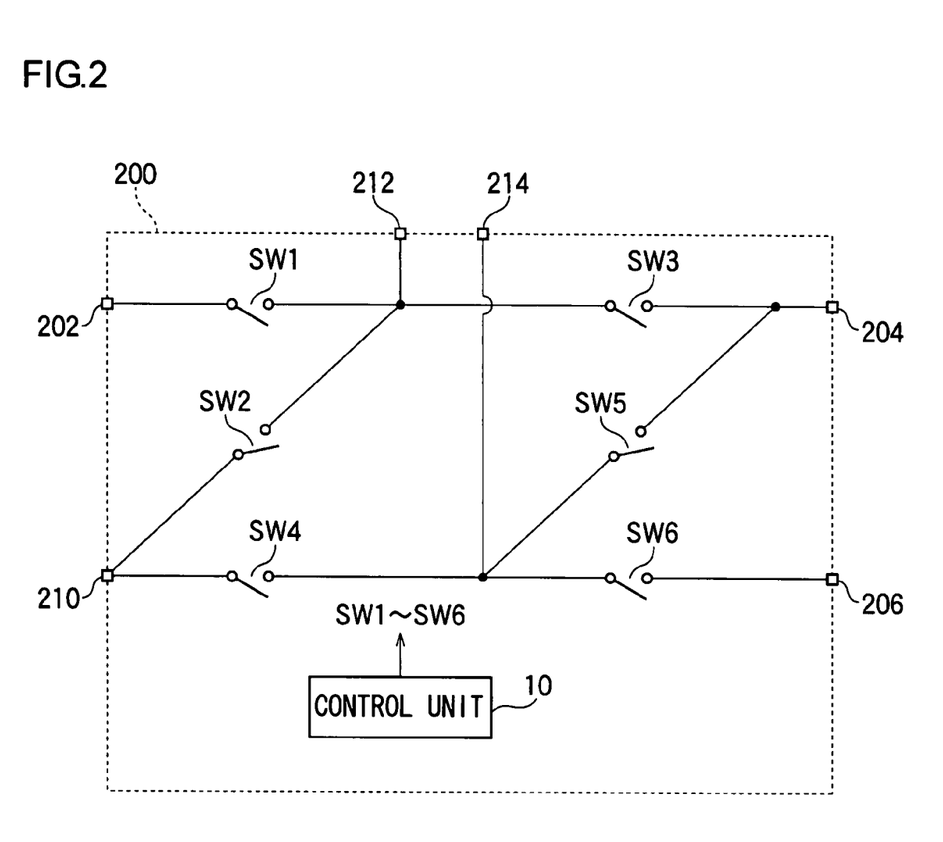
FIG. 2 is a circuit diagram showing a structure of a driver circuit of the switching power supply apparatus shown in FIG. 1.

FIG. 2 is a circuit diagram showing a structure of a driver circuit 200 of the switching power supply apparatus 100 shown in FIG. 1. It is preferable that the first switch SW1 to the sixth switch SW6 and the control unit 10 be integrally formed as a function IC.

An input terminal 202 of the driver circuit 200 is connected to the input terminal 102 shown in FIG. 1, and the input voltage Vin is applied to this input terminal 202 thereof. Terminals 212 and 214 are connected with the one end 20 and the other end 22 of the flying capacitor shown in FIG. 1. A terminal 210 is connected to a ground potential whose potential is fixed. An output terminal 204 of the driver circuit 200 is connected with the first output terminal 104 of FIG. 1 and is hence connected with the first output capacitor Co1. An output terminal 206 of the driver circuit 200 is connected with the second output terminal 106 of FIG. 1 and is hence connected with the second output capacitor Co2. The control unit 10 is connected with the first switch SW1 to the sixth switch SW6 via a wiring (not shown) and controls the ON-OFF states of the respective switches.

Figure 3:
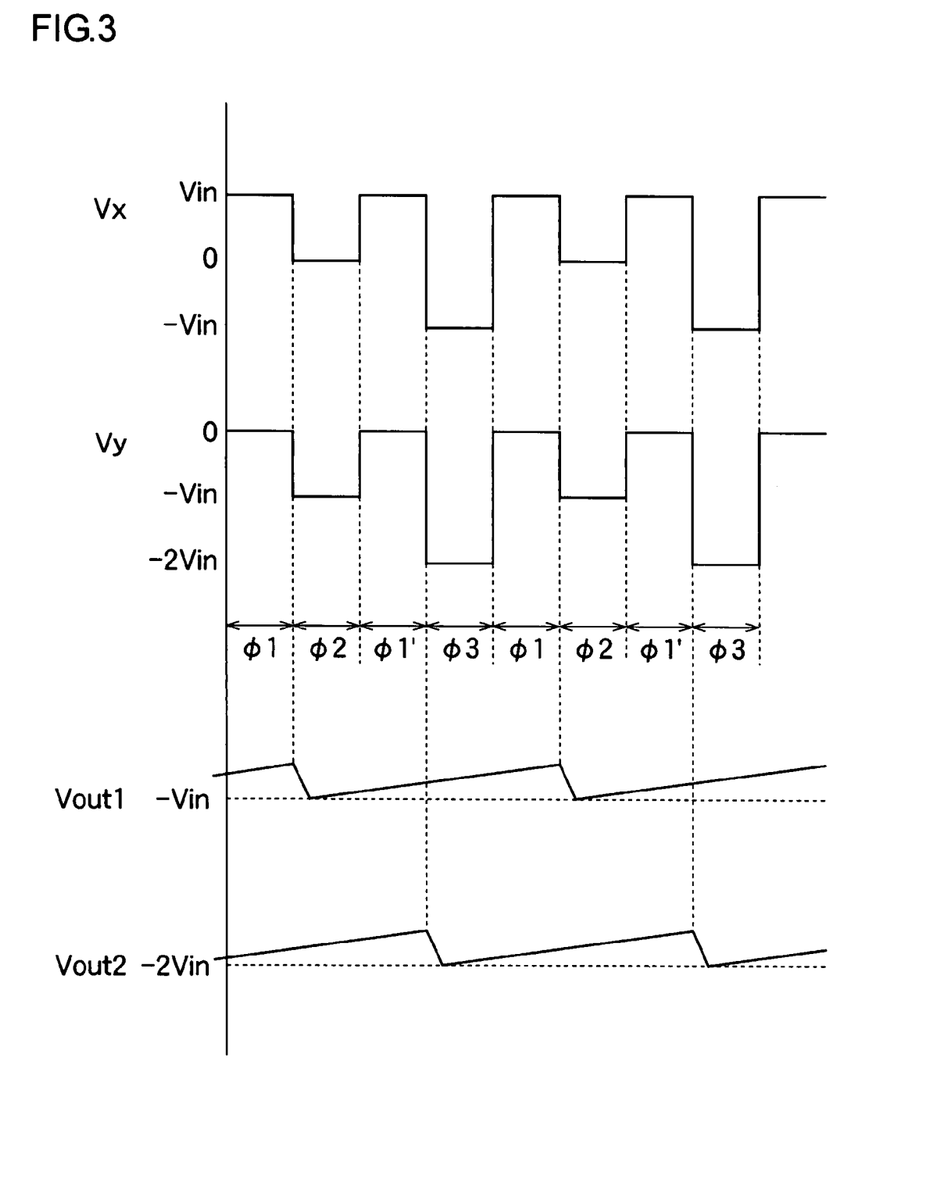
FIG. 3 is a timing chart showing a voltage waveform of each terminal of the switching power supply apparatus shown in FIG. 1.

An operation of the switching power supply apparatus 100, structured as above, according to the first embodiment will now be described with reference to FIG. 3. FIG. 3 is a timing chart showing a voltage waveform of each terminal of the switching power supply apparatus 100 shown in FIG. 1. For clarity, the vertical axis and the horizontal axis in each of timing charts shown in this patent specification are enlarged or reduced as appropriate, and the each waveform is also simplified to facilitate the understanding thereof.

The control unit 10 switches among the first charging period ϕ1 in which the flying capacitor Cf is charged with the first switch and the fourth switch SW being simultaneously ON, the second charging period ϕ2 in which the first output capacitor Co1 is charged with the second switch SW2 and the fifth switch SW5 being ON, and the third charging period ϕ3 in which the second output capacitor Co2 is charged with the third switch SW3 and the sixth switch SW6 being ON.

Referring to FIG. 3, the first charging period ϕ1 in which the flying capacitor Cf is charged is interposed between the second charging period ϕ2 and the third charging period ϕ3 in which the output capacitors are charged. For purposes of illustration, a first charging period in the midst of shifting from a third charging period ϕ3 to a second charging period ϕ2 is denoted by ϕ1 and, conversely, a first charging period in the midst of shifting from a second charging period ϕ2 to a third charging period ϕ3 is denoted by ϕ1', so that a distinction is made between the two charging periods ϕ1 and ϕ1'.

In the first charging period ϕ1, the first switch SW1 and the fourth switch SW4 turn on. As a result, the voltage at the one end 20 of the flying capacitor Cf becomes Vx=Vin and the voltage at the other end 22 thereof becomes Vy=0. Then the flying capacitor Cf is charged with the input voltage Vin and the electric charge is stored therein.

Next, the charging period is switched to a second charging period ϕ2 by the control unit 10. Since in the second charging period ϕ2 the second switch SW2 turns on, the voltage at the one end 20 of the flying capacitor Cf becomes Vx=0 V. Since, in the first charging period ϕ1 immediately before this second charging period ϕ2, the flying capacitor Cf has been charged with the input voltage Vin, the voltage at the other end 22 of the flying capacitor Cf becomes Vy=0−Vin=−Vin. Since in the second charging period ϕ2 the fifth switch SW5 also turns on, the first output capacitor Co1 is charged with the voltage Vy.

Then the charging period is switched to a first charging period ϕ1' again, so that the first switch SW1 and the fourth switch SW4 turn on and the voltage across the flying capacitor Cf is recharged with the input voltage Vin.

Next, the charging period is switched to a third charging period ϕ3 and the third switch SW3 turns on, so that the one end 20 of the flying capacitor Cf is connected with the first output terminal 104 and Vx=−Vin holds. Since, in the first charging period ϕ1' immediately before this third charging period ϕ3, the flying capacitor Cf has been charged with the input voltage Vin, the voltage at the other end 22 of the flying capacitor Cf becomes Vy=−Vx−Vin=−2×Vin. Since in this third charging period ϕ3 the sixth switch SW6 also turns on, the second output capacitor Co2 is charged with the voltage Vy=−Vin at the other end 22 of the flying capacitor Cf.

If the three different periods of ϕ1, ϕ2, ϕ1' and ϕ3 are repeated in this manner, the first output capacitor Co1 and the second output capacitor Co2 are charged with −Vin and −Vin, respectively.

At the first output terminal 104, the voltage of the first output capacitor Co1 appears as the first output voltage Vout1. The first output capacitor Co1 is charged up in the second charging period φ2. And in the first charging period φ1 and the third charging period φ3, the current flows through a load circuit connected with the second output terminal 106, so that the first output capacitor Co1 is discharged. Thus, as shown in FIG. 3, the first output voltage Vout1 drops down to −Vin in the second charging period φ2. Thereafter, the current flows through the load circuit, so that the first output voltage Vout1 gradually rises in the charging periods of φ1', φ3 and φ1.

Similarly, at the second output terminal 106 the voltage of the second output capacitor Co2 appears as the second output voltage Vout2. The second output capacitor Co2 is charged up in the third charging period φ3. And in the first charging period φ1 and the second charging period φ2, the current flows through the load circuit, so that the second output capacitor Co2 is discharged. Thus, as shown in FIG. 3, the second output voltage Vout2 drops down to −2×Vin in the third charging period φ3. Thereafter, the current flows through the load circuit, so that the second output voltage Vout2 gradually rises in the charging periods of φ1, φ2 and φ1'.

In this manner, by employing the switching power supply apparatus 100 according to the first embodiment that realizes a simplified circuit configuration, the inverted voltage and the doubled inverted voltage are generated from the input voltage Vin applied to the input terminal 102 and they can be simultaneously outputted from the first output terminal 104 and the second output terminal 106, respectively.

In this switching power supply apparatus 100, the flying capacitor Cf is used in a time-division manner to generate two output voltages. Thus, the number of capacitors used can be reduced by one, as compared to a case where two charge-pump circuits are used to generate the inverted voltage and the doubled inverted voltage, respectively. Further, the control unit 10 can be shared, so that the circuitry can be simplified.

If load current flowing through the first output terminal 104 and the second output terminal 106 is small, the drop in the output voltages Vout1 and Vout2 will be small, so that the first charging period φ1 or φ1' may be omitted in the timing chart shown in FIG. 2. Moreover, the order in which first charging period φ1 to the third charging period φ3 are arranged may be changed in accordance with a drive condition of a load.

Though a description was given of a case where in FIG. 3 the inverted voltage and the doubled inverted voltage are simultaneously outputted from the first output terminal 104 and the second output terminal 106, respectively, only either one of them may be outputted. For instance, if the inverted voltage only is required, the first charging period φ1 and the second charging period φ2 may be repeated. Similarly, if the doubled inverted voltage only is required, the first charging period φ1 and the third charging period φ3 may be repeated alternately.

Second Embodiment

A switching power supply apparatus according to a second embodiment of the present invention includes a function of outputting a third output voltage Vout3, in addition to the first output voltage Vout1 and the second output voltage Vout2 of the switching power supply apparatus 100 according to the first embodiment. The third output voltage Vout3 is double the input voltage Vin (=2×Vin).

Figure 4:
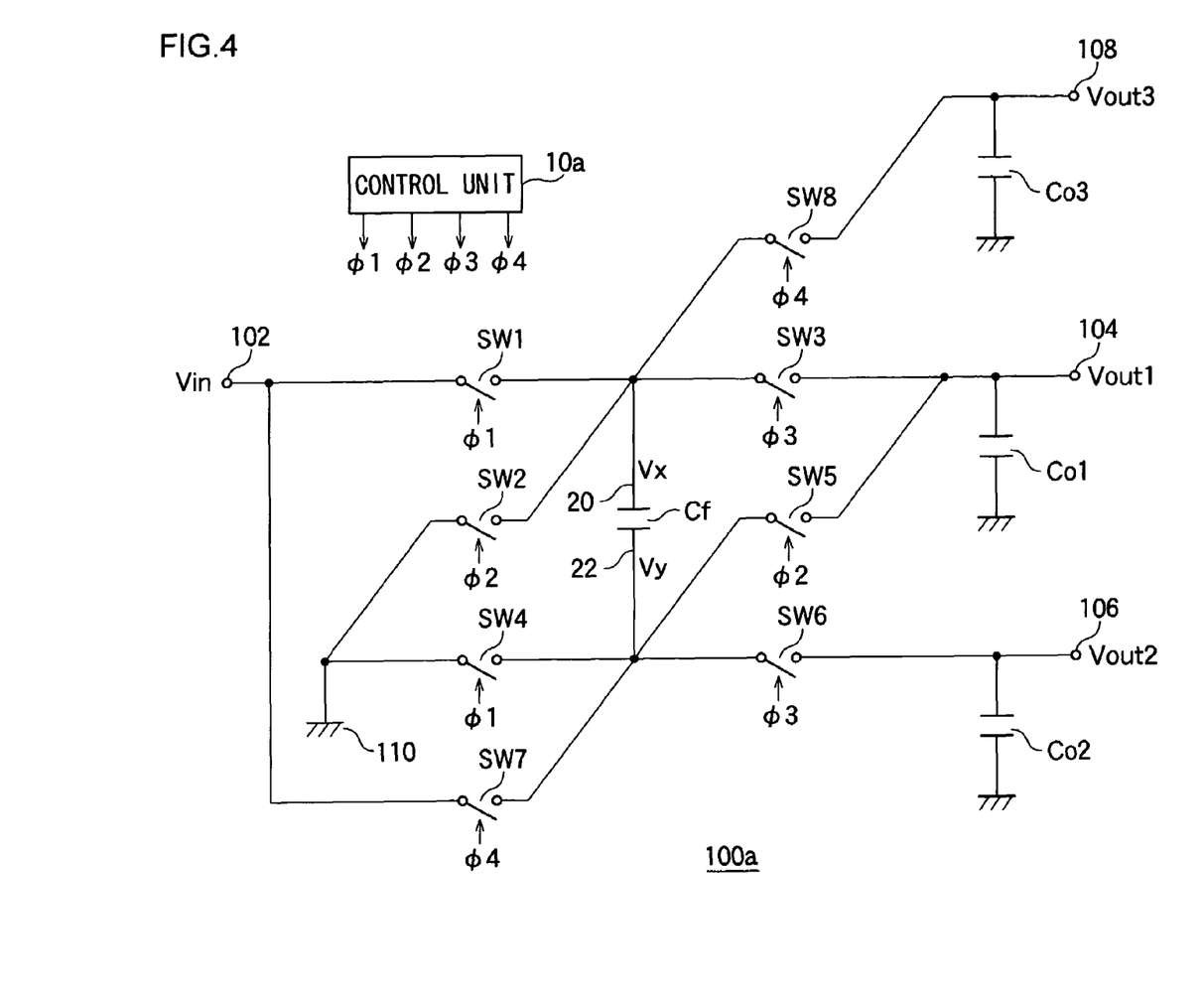
FIG. 4 is a circuit diagram showing a structure of a switching power supply apparatus according to a second embodiment of the present invention.

FIG. 4 is a circuit diagram showing a structure of a switching power supply apparatus 100a according to a second embodiment of the present invention. For Figures shown hereinafter, the same or equivalent components as those described so far will be given the same reference numerals as before and the explanation thereof will be omitted as appropriate.

The switching power supply apparatus 100a includes a third output capacitor Co3, a seventh switch SW7 and an eighth switch SW8, in addition to the components of the switching power supply apparatus 100 shown in FIG. 1. In the second embodiment, the driver circuit shown in FIG. 2 added with the seventh switch SW7 and the eighth switch SW8 is integrated in a package. The driver circuit according to the second embodiment controls a charge state of the third output capacitor Co3, in addition to the first output capacitor Co1 and the second output capacitor Co2.

The seventh switch SW7 is provided between the other end 22 of the flying capacitor Cf and the input terminal 102. The eighth switch SW8 is provided between the one end 20 of the flying capacitor Cf and a third output terminal 108.

As the seventh switch SW7 turns on, the other end 22 of the flying capacitor Cf is connected with the input terminal 102 and its voltage Vy becomes equal to the input voltage Vin. As a result, the one end 20 of the flying capacitor Cf becomes Vx=Vy+ΔV=Vin+ΔV. In the state where the flying capacitor Cf has been charged with the input voltage Vin (ΔV=Vin), Vx=2×Vin holds.

At this time, if the eighth switch SW8 is simultaneously turned on, the one end 20 of the flying capacitor Cf will be connected with the third output terminal 108, and the third output capacitor Co3 connected between the third output terminal 108 and ground will be charged with a voltage Vx, namely a voltage (2×Vin) which is double the input voltage Vin. A period during which the third output capacitor Co3 is charged with a voltage of double the input voltage after the seventh switch SW7 and the eighth switch SW8 have turned on is denoted by φ4.

In the switching power supply apparatus 100a according to the second embodiment, a control unit 10a controls the charge states of the first output capacitor Co1 to the third output capacitor Co3 and the flying capacitor Cf by repeating the first charging period φ1 to the fourth charging period φ4. That is, the control unit 10a controls the ON-OFF states of the first switch SW1 to the eighth switch SW8. Note that the operations of the first charging period φ1 to the third charging period φ3 are the same as those described in the first embodiment.

Figure 5:
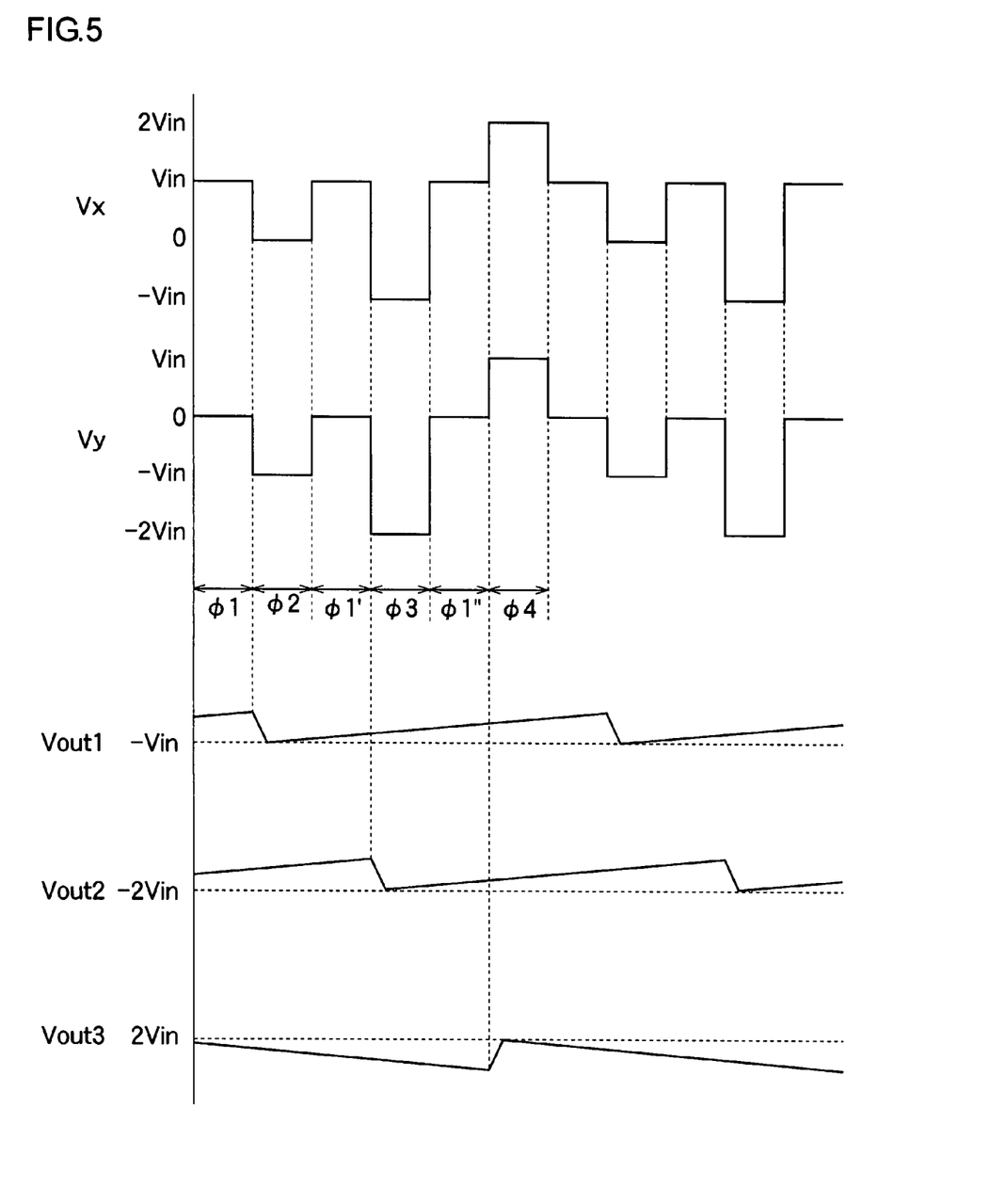
FIG. 5 is a timing chart showing a voltage waveform of each terminal of the switching power supply apparatus shown in FIG. 4.

An operation of the switching power supply apparatus 100a, as structured as above, according to the second embodiment will now be described with reference to FIG. 5. FIG. 5 is a timing chart showing a voltage waveform of each terminal of the switching power supply apparatus 100a shown in FIG. 4.

The control unit 10 repeats, in a predetermined pattern, the first charging period φ1, the second charging period φ2, the third charging period φ3 and the fourth charging period φ4. Here, in the first charging period φ1 the first switch SW1 and the fourth switch SW4 are simultaneously turned on to charge the flying capacitor Cf. In the second charging period φ2, the second switch SW2 and the fifth switch SW5 are turned on to charge the first output capacitor Co1. In the third charging period φ3, the third switch SW3 and the sixth switch SW6 are turned on to charge the second output capacitor Co2. In the fourth charging period φ4, the seventh switch SW7 and the eighth switch SW8 are turned on to charge the third output capacitor Co3.

Referring to FIG. 5, the first charging period φ1 in which the flying capacitor Cf is charged is interposed among the second charging period φ2, the third charging period φ3 and the fourth charging period φ4 in which the output capacitors are charged. A first charging period between from a third charging period φ3 to a fourth charging period φ4 is denoted by φ1".

The operations of the first charging period φ1 to the third charging period φ3 are similar to those described in the first embodiment. After the third charging period φ3, the flying capacitor Cf is recharged with the input voltage Vin in a first charging period φ1". In a fourth charging period φ4 following this first charging period φ1", the third output capacitor Co3 is charged with a voltage of double the input voltage Vin, namely 2×Vin.

In the third output terminal 108, a voltage of the third capacitor Co3 appears as a third output voltage Vout3. The third output capacitor Co3 is charged in the fourth charging period φ4, and is discharged in the first charging period φ1 to the third charging period φ3 when the current flows to a load circuit. Thus, as shown in FIG. 5, the third output voltage Vout3 rises up to 2×Vin in the fourth charging period φ4. Subsequent to this fourth charging period φ4, the current flows to the load circuit, so that the third output voltage Vout3 gradually drops in the charging periods of φ1, φ2, φ1', φ3 and φ1".

In this manner, by employing the switching power supply apparatus 100a according to the second embodiment that realizes a simplified circuit configuration, the inverted voltage, the doubled inverted voltage and the doubled voltage are generated from the input voltage Vin applied to the input terminal 102 and they can be simultaneously outputted from the first output terminal 104, the second output terminal 106 and the third output terminal 108, respectively.

Figure 6:
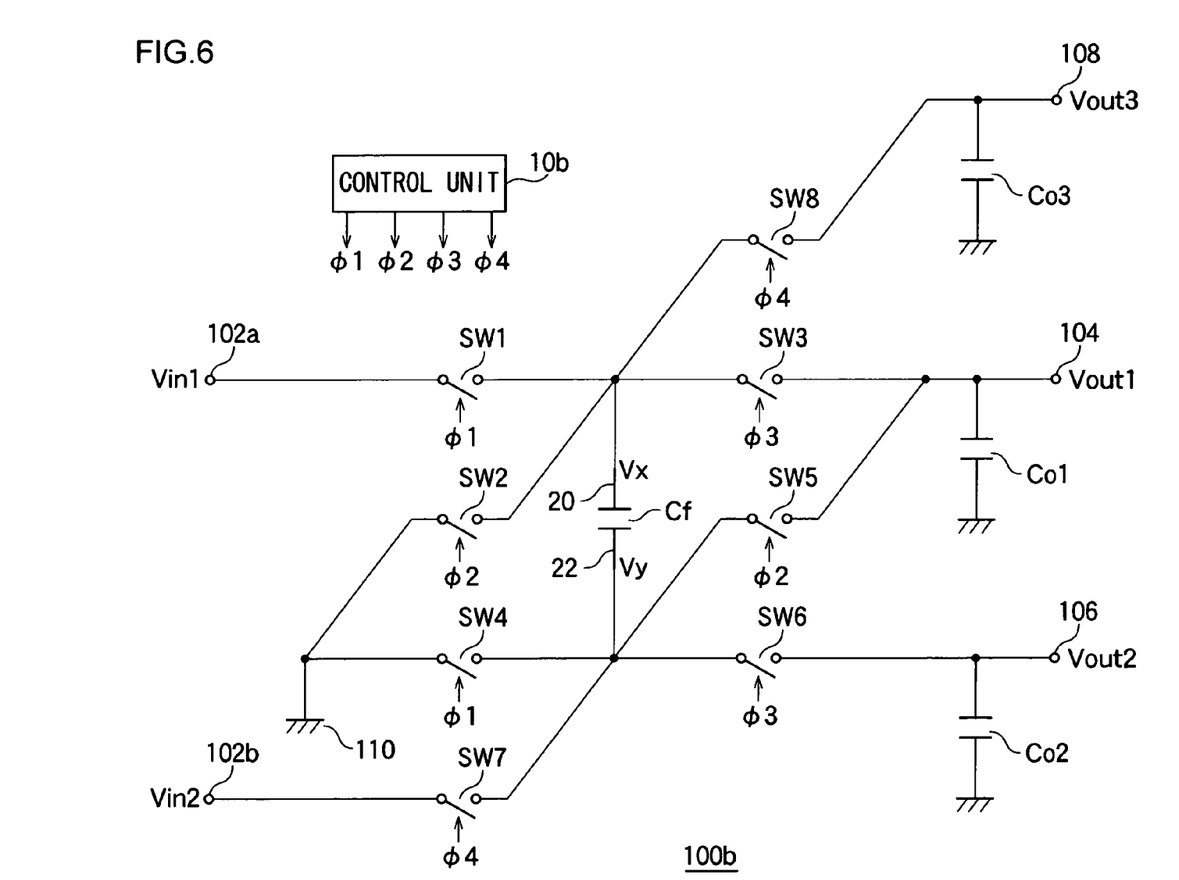
FIG. 6 is a circuit diagram showing a modification of the switching power supply apparatus shown in FIG. 4.

FIG. 6 is a circuit diagram showing a modification of the switching power supply apparatus 100a shown in FIG. 4. A switching power supply apparatus 100b shown in FIG. 6 includes two input terminals 102a and 102b which are independent from each other. Hereinbelow, these two input terminals will be denoted by a first input terminal 102a and a second input terminal 102b, respectively, and voltages inputted thereto are denoted by a first input voltage Vin1 and a second input voltage Vin2, respectively.

In the switching power supply apparatus 100b shown in FIG. 6, the first switch SW1 is provided between the one end 20 of the flying capacitor Cf and the first input terminal 102a, whereas the seventh switch SW7 is provided between the other end 22 of the flying capacitor Cf and the second input terminal 102b. Other circuit components and its circuit structure and the control performed by the control unit 10 are the same as those in the switching power supply apparatus 100a shown in FIG. 4.

By employing the switching power supply apparatus 100b as shown in FIG. 6, a sum voltage Vin1+Vin2 which is the sum of the first input voltage Vin1 and the second input voltage Vin2 can be outputted, as the third output voltage Vout3, from the third output terminal 108. Also, the inverted voltage of the first input voltage Vin1 can be outputted from the first output terminal 104, whereas the doubled inverted voltage of the first input voltage Vin1 can be outputted from the second output terminal 106.

The switching power supply apparatuses according to any or some of the above-described embodiments may be perceived and realized as embodiments of the following technical idea 1 that underlies the present invention.

Technical Idea 1 Underlying the Present Invention (a) Based on the input voltage inputted to an input terminal, the switching power supply apparatus generates a first output voltage to an nth output voltage (n being an integer greater than or equal to 2) each differing from one another and outputs them from first through nth output terminals, respectively.

(b) This switching power supply apparatus comprises: a flying capacitor charged with an input voltage; a first output capacitor to an nth output capacitor provided for a first output terminal to an nth output terminal, respectively; a plurality of switches provided on charge paths leading to or from the flying capacitor and the first through nth output capacitors; and a control unit which controls charge states of the flying capacitor and the plurality n of output capacitors by controlling ON-OFF states of the plurality of switches.

(c) When any one of the input voltage, the ground voltage and an ith output voltage appearing at an ith output capacitor (i being an integer that satisfies $1 \leq i \leq n$) is set to a reference voltage, a jth output voltage appearing at a jth output capacitor (j being an integer that satisfies $1 \leq j \leq n$ and $i \neq j$) is a voltage such that:

(1) the input voltage is added to the reference voltage; or (2) the input voltage is subtracted from the reference voltage.

(d) The control unit performs the following controls in the charge state of the jth output capacitor:

(d-1) In a case when the input voltage is added to the reference voltage:

A switch provided between a high-potential-side terminal of the flying capacitor and a jth output terminal and a switch provided between a low-potential-side terminal of the flying capacitor and a terminal at which the reference voltage appears are turned on.

(d-2) In a case when the input voltage is subtracted from the reference voltage:

A switch provided between a low-potential-side terminal of the flying capacitor and a jth output terminal and a switch provided between a high-potential-side terminal of the flying capacitor and a terminal at which the reference voltage appears are turned on.

In a predetermined pattern, this switching power supply apparatus repeats in a time-division manner the state of charge where the flying capacitor and the first output capacitor to the nth output capacitor are charged. Note that it is not always necessary that all of output capacitors are charged. And it suffices that the charging of output capacitors connected with terminals requiring the output voltage and the charging of flying capacitor are repeated.

The first embodiment corresponds to the case where n=2 in this technical idea. The first output voltage Vout1 (j=1) appearing at the first output terminal 104 is a voltage obtained after the input voltage Vin has been subtracted from the ground voltage serving as the reference voltage. When the first output capacitor Co1 is to be charged, the control unit 10 turns on the fifth switch SW5 provided between the low-potential-side terminal 22 of the flying capacitor Cf and the first output terminal 104 and the second switch SW2 provided between the high-potential-side terminal 20 of the flying capacitor Cf and the ground terminal 110 at which the ground voltage serving as the reference appears.

The second output voltage Vout2 (j=2) appearing at the second output terminal 106 is a voltage obtained after the input voltage Vin has been subtracted from the first output voltage Vout1 (i=1) serving as the reference voltage. When the second output capacitor Co2 (j=2) is to be charged, the control unit 10 turns on the sixth switch SW6 provided between the low-potential-side terminal 22 of the flying capacitor Cf and the second output terminal 106 and the third switch SW3 provided between the high-potential-side terminal 20 of the flying capacitor Cf and the first output terminal 104 at which the first output voltage Vout1 serving as the reference voltage appears.

The second embodiment corresponds to the case where n=3 in this technical idea. The third output voltage Vout3 (j=3) appearing at the third output terminal 108 is a voltage obtained after the input voltage Vin has been added to the input voltage Vin serving as the reference voltage. When the third output capacitor Co3 (j=3) is to be charged, the control unit 10 turns on the eighth switch SW8 provided between the high-potential-side terminal 20 of the flying capacitor Cf and the third output terminal 108 and the seventh switch SW7 provided between the low-potential-side terminal 22 of the flying capacitor Cf and the input terminal 102 at which the input voltage Vin serving as the reference appears.

According to this technical concept, a plurality of different voltages which are integral multiples of the input voltage can be produced by using a single flying capacitor and an output capacitor for each output, that is, by using a small number of circuit components. For instance, 3× voltage, 4× voltage and the like can be generated and outputted, and −3× voltage, −4× voltage and the like can also be generated. Also, the number of output voltages can be extended to four, five and the like.

If this technical concept is extended to the case of a plurality of input voltages, the following technical idea 2 will be derived.

Technical Idea 2 Underlying the Present Invention (e) The input terminal includes a first input terminal and a second input terminal to which a first input voltage and a second input voltage are inputted, respectively.

(f) The flying capacitor is charged with the first input voltage.

(g) If any one of the first input voltage, the second input voltage, the ground voltage and the ith output voltage is outputted as the reference voltage, the jth voltage will be (1) a voltage obtained after the first input voltage has been added to the reference voltage or (2) a voltage obtained after the first input voltage has been subtracted from the reference voltage.

According to this extended technical concept, it is possible to generate different levels of voltages by combining two input voltages. FIG. 6 corresponds to this extended technical idea. The technical idea 1 may be thought of as a case in which the first input voltage is equal to the second input voltage in the technical idea 2.

Figure 7:
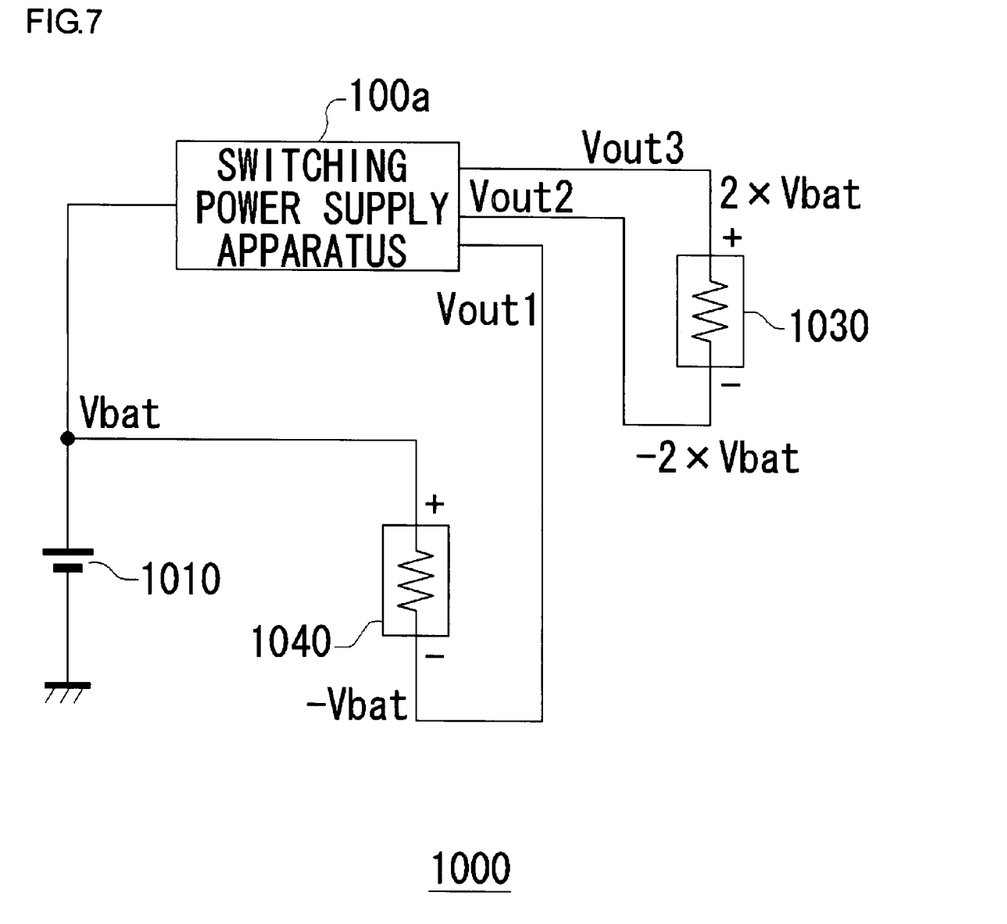
FIG. 7 is a block diagram showing a structure of an electronic apparatus mounting the switching power supply apparatus shown in FIG. 4.

Lastly, a description will be given of a use of the switching power supply apparatus according to the present embodiments. The switching power supply apparatus according to the present embodiments can be suitably used for an electronic apparatus such as a battery-powered mobile phone terminal or PDA, for instance. FIG. 7 is a block diagram showing a structure of an electronic apparatus mounting the switching power supply apparatus 100a of FIG. 4.

An electronic apparatus 1000 is comprised of a battery 1010, a switching power supply apparatus 100a, a first load 1030, and a second load 1040. The switching power supply apparatus 100a converts a battery voltage Vbat outputted from the battery 1010 into a first output voltage Vout1(=−Vbat), a second output voltage Vout2(=−2×Vbat) and a third output voltage Vout3(=2×Vbat) and then outputs them. The first load 1030 and the second load 1040 each operates on a positive/negative power supply.

The first load 1030 is driven by the positive/negative power supply of about ±(6 to 8) V. A positive power-supply terminal (+) of the first load 1030 is connected to the third output terminal 108 of the switching power supply apparatus 100a where the third output voltage Vout3(=2Vbat) is supplied. A negative power-supply terminal (−) of the first load 1030 is connected to the second output terminal 106 of the switching power supply apparatus 100a where the second output voltage Vout2(=−2Vbat) is supplied.

The second load 1040 is driven by the positive/negative power supply of about ±(3 to 4) V. A positive power-supply terminal (+) of the second load 1040 is connected to the battery 1010 where the battery voltage Vbat is supplied. A negative power-supply terminal (−) of the second load 1040 is connected to the first output terminal 104 of the switching power supply apparatus 100a where the first output voltage Vout1(=−Vbat) is supplied.

As described above, the switching power supply apparatus 100 according to the present embodiments can suitably drive a load requiring either or both of a positive power supply and a negative power supply. The components that constitute a switching power supply apparatus 100 are a flying capacitor, output capacitors and a driver circuit. That is, the number of circuit elements required is small and the total area occupied by these circuit elements is also small, thus contributing to the reduced size of the electronic apparatus 1000.

The above-described embodiments are merely exemplary, and it is understood by those skilled in the art that various modifications to the combination of each component and process thereof are possible and such modifications are also within the scope of the present invention.

In the present embodiments, the elements constituting a switching power supply apparatus 100 may all be integrated in a single package, or may be formed by two or more packages and some of them may be comprised of discrete parts. Which of the parts is to be integrated may be determined in consideration of the cost, the area to be occupied, the usage and the like.

While the preferred embodiments of the present invention have been described using specific terms, such description is for illustrative purposes only, and it is to be understood that changes and variations may be further made without departing from the spirit or scope of the appended claims.

What is claimed:

1. A switching power supply apparatus for generating a first output voltage having a reversed polarity of an input voltage and a second output voltage of double the input voltage with a reversed polarity and then outputting them from a first output terminal and a second output terminal, the apparatus comprising:

a flying capacitor;

a first output capacitor connected with the first output terminal;

a second output capacitor connected with the second output terminal; and a driver circuit which controls charge states of said flying capacitor, said first output capacitor and said second output capacitor, wherein said driver circuit repeats a first charging period, a second charging period and a third charging period in a time-division manner, where the first charging period is a period during which said flying capacitor is charged with the input voltage, the second charging period is a period in which a high-potential-side terminal of said flying capacitor is connected with a fixed potential terminal and said first output capacitor is charged with a voltage appearing at the other end thereof, and the third charging period is a period in which a high-potential-side terminal of said flying capacitor is connected with the first output terminal and said second output capacitor is charged with a voltage appearing at the other end thereof, and wherein the voltages appearing at said first output capacitor and said second output capacitor are outputted from the first output terminal and the second output terminal as the first output voltage and the second output voltage.

2. A switching power supply apparatus according to claim 1, wherein said driver circuit controls the charge states of said flying capacitor, said first output capacitor and said second output capacitor in a cycle of the first charging period, the second charging period and the third charging period.

3. A switching power supply apparatus, according to claim 1, for further generating a third output voltage which is double the input voltage and then outputting it from a third output terminal, the apparatus further comprising:
a third output capacitor connected with the third output terminal,
wherein said driver circuit controls a charge state of said third output capacitor in addition to said first output capacitor and said second output capacitor and, in addition to the first to the third charging period, said driver circuit repeats a fourth charging period in which a low-potential-side of said flying capacitor is connected with an input terminal to which the input voltage is inputted and said third output capacitor is charged with a voltage appearing at the other end thereof, and
wherein a voltage appearing at said third output capacitor is outputted as the third output voltage from the third output terminal.

4. A switching power supply apparatus according to claim 3, wherein said driver circuit charges said flying capacitor in the first charging period before charging said first output capacitor, said second output capacitor and said third output capacitor in the second charging period, the third charging period and the fourth charging period, respectively.

5. A switching power supply apparatus for generating a first output voltage having a reversed polarity of an input voltage and a second output voltage of double the input voltage Vin with a reversed polarity and then outputting them from a first output terminal and a second output terminal, the apparatus comprising:
a flying capacitor;
a first output capacitor provided between the first output terminal and a fixed potential terminal;
a second output capacitor provided between the second output terminal and a fixed potential terminal;
a first switch provided between one end of said flying capacitor and an input terminal;
a second switch provided between the one end of said flying capacitor and a fixed voltage terminal;
a third switch provided between the one end of said flying capacitor and the first output terminal;
a fourth switch provided between other end of said flying capacitor and a fixed potential terminal;
a fifth switch provided between the other end of said flying capacitor and the first output terminal;
a sixth switch provided between the other end of said flying capacitor and the second output terminal; and
a control unit which controls on-off states of said first switch to said sixth switch.

6. A switching power supply apparatus according to claim 5, wherein said control unit repeats a first charging period, a second charging period and a third charging period in a time-division manner,
where the first charging period is a period in which said first switch and said fourth switch are turned on and said flying capacitor is charged with the input voltage,
the second charging period is a period in which said second switch and said fifth switch are turned on and said first output capacitor is charged with a voltage having the reversed polarity of the input voltage, and
the third charging period is a period in which said third switch and said sixth switch are turned on and said second output capacitor is charged with a voltage of double the input voltage with the reversed polarity.

7. A driver circuit for driving a switching power supply apparatus according to claim 5, the driver circuit including said first switch to said sixth switch; and said control unit,
wherein said driver circuit is integrated onto a single semiconductor substrate.

8. A switching power supply apparatus according to claim 5, for further generating a third output voltage which is double the input voltage and then outputting it from a third output terminal, the apparatus further comprising:
a third output capacitor connected with the third output terminal;
a seventh switch provided between the other end of said flying capacitor and the input terminal; and
an eighth switch provided between the one end of said flying capacitor and the third output terminal,
wherein said control unit further controls on-off states of said seventh switch and said eighth switch.

9. A switching power supply apparatus according to claim 8, wherein said control unit repeats a first charging period, a second charging period, a third charging period and a fourth charging period in a time-division manner,
where the first charging period is a period in which said first switch and said fourth switch are turned on and said flying capacitor is charged with the input voltage,
the second charging period is a period in which said second switch and said fifth switch are turned on and said first output capacitor is charged with a voltage having the reversed polarity of the input voltage,
the third charging period is a period in which said third switch and said sixth switch are turned on and said second output capacitor is charged with a voltage of double the input voltage with the reversed polarity, and
the fourth charging period is a period in which said seventh switch and said eighth switch are turned on and said third output capacitor is charged with a voltage of double the input voltage.

10. A driver circuit for driving a switching power supply apparatus according to claim 8, the driver circuit including said first switch to said eighth switch; and said control unit,
wherein said driver circuit is integrated onto a single semiconductor substrate.

11. A switching power supply apparatus for generating a first output voltage to an nth output voltage (n being an integer greater than or equal to 2), whose voltage levels differ from one another, based on an input voltage inputted to an input terminal and then outputting them respectively from first through nth output terminals, the apparatus comprising:
a flying capacitor which is charged with the input voltage;
a first output capacitor to an nth output capacitor provided for the first output terminal to the nth output terminal, respectively;
a plurality of switches provided on charging paths leading to or from said flying capacitor and said first output through nth output capacitors; and
a control unit which controls charge states of said flying capacitor and said n output capacitors by controlling on-off states of the plurality of switches,
wherein when any one of the input voltage, ground voltage, an ith output voltage appearing at an ith output capacitor (i being an integer that satisfies $1 \leq i \leq n$) is set as a reference voltage, a jth output voltage appearing at a jth output capacitor (j being an integer that satisfies $1 \leq j \leq n$ and $i \neq j$) is a voltage obtained after the input voltage has been added to the reference voltage or after the input voltage has been subtracted from the reference voltage, and wherein when the input voltage is to be added to the reference voltage, said control unit turns on a switch provided between a high-potential-side terminal of said flying capacitor and the jth output terminal and a switch provided between a low-potential-side terminal of said flying capacitor and a terminal at which the reference voltage appears, in the charge state of the jth output capacitor, and when the input voltage is to be subtracted from the reference voltage, said control unit turns on a switch provided between a low-potential-side terminal of said flying capacitor and the jth output terminal and a switch provided between a high-potential-side terminal of said flying capacitor and a terminal at which the reference voltage appears, in the charge state of the jth output capacitor.

12. A switching power supply apparatus according to claim 11, wherein the input terminal includes a first input terminal and a second input terminal to which a first input voltage and a second input voltage are inputted, respectively, wherein said flying capacitor is charged with the first input voltage, and wherein when any one of the first input voltage, the second input voltage, ground voltage and the ith output voltage is set as the reference voltage, the jth output voltage is a voltage obtained after the input voltage has been added to the reference voltage or after the input voltage has been subtracted from the reference voltage.

13. A driver circuit for driving a switching power supply apparatus according to claim 11, the driver circuit including said plurality of switches; and said control unit which controls on-off states of said plurality of switches, wherein said driver circuit is integrated onto a single semiconductor substrate.

14. An electronic apparatus, comprising:
a switching power supply apparatus according to claim 1; and
a plurality of loads driven by output voltage of said switching power supply apparatus.

15. An electronic apparatus, comprising:
a switching power supply apparatus according to claim 5; and
a plurality of loads driven by output voltage of said switching power supply apparatus.

16. An electronic apparatus, comprising:
a switching power supply apparatus according to claim 11; and
a plurality of loads driven by output voltage of said switching power supply apparatus.

* * * * *